United States Patent
Kremer et al.

(10) Patent No.: US 10,427,455 B2
(45) Date of Patent: Oct. 1, 2019

(54) WHEEL HUB BEARING UNIT OF A MOTOR VEHICLE

(71) Applicant: FORD GLOBAL TECHNOLOGIES, LLC, Dearborn, MI (US)

(72) Inventors: Carsten Kremer, Roetgen (DE); Gerd Bruessler, Bergisch Gladbach (DE); Hubertus Von Chappuis, Bedburg (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/040,266

(22) Filed: Jul. 19, 2018

(65) Prior Publication Data
US 2019/0039410 A1   Feb. 7, 2019

(30) Foreign Application Priority Data

Aug. 1, 2017   (DE) .......................... 10 2017 213 273

(51) Int. Cl.
*B60B 27/00*   (2006.01)
*F16C 35/063*   (2006.01)
(Continued)

(52) U.S. Cl.
CPC .......... *B60B 27/0078* (2013.01); *B60B 27/00* (2013.01); *B60B 27/0005* (2013.01); *F16C 19/18* (2013.01); *F16C 33/586* (2013.01); *F16C 35/063* (2013.01); *F16C 35/067* (2013.01); *F16C 19/184* (2013.01); *F16C 2226/60* (2013.01); *F16C 2326/02* (2013.01)

(58) Field of Classification Search
CPC .............. B60B 27/0005; B60B 27/001; B60B 27/0047; B60B 27/0078; B60B 27/0094; B60B 2380/90; F16C 19/18; F16C 19/186; F16C 35/06; F16C 35/067; F16C 2326/02
See application file for complete search history.

(56) References Cited

U.S. PATENT DOCUMENTS

| | | | |
|---|---|---|---|
| 2004/0126046 A1* | 7/2004 | Chiang | F16C 35/067 384/545 |
| 2011/0103731 A1* | 5/2011 | Fahrni | F16C 35/067 384/572 |

FOREIGN PATENT DOCUMENTS

| | | |
|---|---|---|
| DE | 102004018900 A1 | 11/2005 |
| DE | 102012221702 A1 | 6/2013 |

(Continued)

OTHER PUBLICATIONS

Translation of DE102013017467 obtained Mar. 21, 2019.*

*Primary Examiner* — James Pilkington
(74) *Attorney, Agent, or Firm* — Ray Coppiellie; Brooks Kushman P.C.

(57) ABSTRACT

A wheel hub bearing unit of a motor vehicle includes at least one roller bearing for mounting a wheel hub. The roller bearing contains an outer ring which, on an outer peripheral face, is at least partially equipped with a first threaded element and at least one inner ring, and a wheel carrier with a mounting hole. A wall of the mounting hole is at least partially equipped with a second threaded element that is provided for mechanical engagement with the first threaded element. The outer ring and the wheel carrier each have at least one contact face, which are provided to come into mutual mechanical contact when the roller bearing is mounted in the wheel carrier.

8 Claims, 2 Drawing Sheets

(51) Int. Cl.
    *F16C 19/18*     (2006.01)
    *F16C 35/067*     (2006.01)
    *F16C 33/58*     (2006.01)

(56) References Cited

FOREIGN PATENT DOCUMENTS

| | | |
|---|---|---|
| DE | 102013017467 A1 | 4/2015 |
| DE | 102016225155 A1 | 4/2018 |
| KR | 20090115560 A | 11/2009 |
| KR | 20090115601 A | 11/2009 |

\* cited by examiner

FIG. 1 PRIOR ART
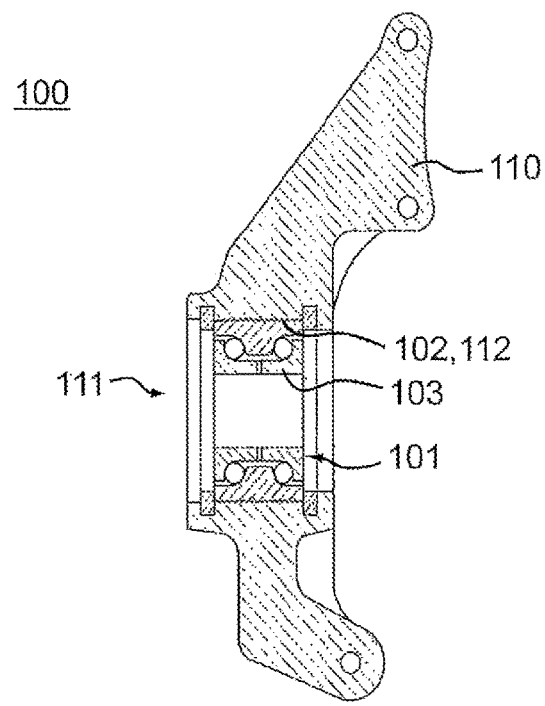
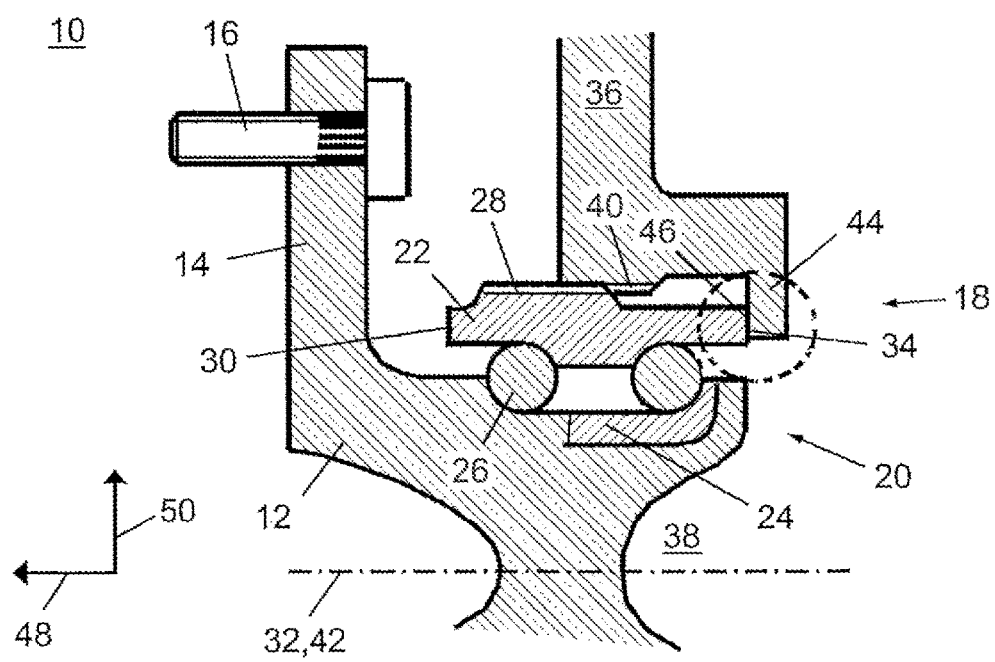
FIG. 2

WHEEL HUB BEARING UNIT OF A MOTOR VEHICLE

CROSS-REFERENCE TO RELATED APPLICATIONS

This application claims foreign priority benefits under 35 U.S.C. § 119(a)-(d) to DE Application 10 2017 213 273.6 filed Aug. 1, 2017, which is hereby incorporated by reference in its entirety.

TECHNICAL FIELD

The disclosure concerns a wheel hub bearing unit of a motor vehicle.

BACKGROUND

In the field of motor vehicle technology, various solutions are known from the prior art for providing a wheel suspension unit with which driven or non-driven wheels of a motor vehicle can be spring-mounted so as to be rotatable relative to a body.

Many driven wheels of motor vehicles are fixed to a flange part of a hub by bolts, and an end of a driveshaft is wedge-fitted to the hub so that the hub is turned by rotation of the driveshaft in order to rotate the wheel. The hub is rotatably mounted via a wheel bearing or hub bearing in a mounting hole of a stub axle or wheel carrier. The hub bearing has a bearing inner ring and a bearing outer ring, wherein the bearing inner ring is fixedly connected to the wheel hub and the bearing outer ring is fixedly connected to the stub axle or wheel carrier.

Hub bearings of an early development stage have a structure in which the bearing outer ring is connected to the stub axle by press fitting in a mounting hole thereof.

When the stub axle and the wheel bearing or hub bearing are made of materials with widely differing temperature expansion coefficients, as is the case for example when using stub axles or wheel carriers made of aluminum to save weight, the press fit must be greatly over-dimensioned. This can make production of the press fit difficult because one of the components could be deformed on application of the necessary pressing force.

For this reason, KR 20090115601 A and KR 20090115560 A, discussed below, disclose wheel hubs with a hub bearing in which an outer ring of the hub bearing can be connected to the stub axle or wheel carrier by means of threaded bolts. This solution requires a greater installation complexity and entails restrictions in relation to a possible physical arrangement of the hub bearing, stub axle or wheel carrier and brake caliper.

KR 20090115601 A therefore proposes a wheel hub bearing coupling structure of a vehicle, with which a wheel hub bearing can be attached to a wheel carrier. The wheel hub bearing coupling structure comprises an inner threaded part and an outer threaded part. The inner threaded part is formed as a threaded nut element in an inner periphery of a central mounting hole of the wheel carrier. An outer ring of the wheel hub bearing coupling structure is equipped with an outer threaded part for connection to the mounting hole. Balls are provided as a roller bearing between the outer ring and an inner ring of the wheel bearing fixing unit. Mounting takes place by screwing the outer threaded part of the wheel hub bearing coupling structure into the inner threaded part of the mounting hole of the wheel carrier, so that deformation of the wheel bearing can be avoided.

In KR 20090115560 A, a fixing structure for a wheel hub bearing is described with which the contact pressure forces between the wheel hub and wheel hub bearing, or between the wheel hub bearing and the driveshaft, can be adjusted. The wheel hub bearing coupling structure of KR 20090115601 A is changed in relation to the wheel hub bearing fixing structure, in that this comprises a wheel hub bearing with an outer ring and a first and a second inner ring, and a wheel hub on which the wheel hub bearing is mounted. Balls are used as roller bearings between the outer ring and the first and the second inner rings respectively. A screw nut thread is formed on a periphery of an inner face of the second inner ring, and an outer thread adapted to the screw nut thread is formed on a peripheral face of the inner end of the wheel hub.

FIG. 1 shows a diagrammatic depiction of a wheel hub bearing unit 100 of a motor vehicle according to KR 20090115601 A in a sectional side view. The wheel hub bearing unit 100 comprises a wheel hub bearing 101 for mounting a wheel hub, and a wheel carrier 110 with a mounting hole 111. The wheel hub bearing 100 contains an outer ring and an inner ring 103, between which two rows of balls are arranged on the periphery. The outer ring is equipped with an outer thread 102 on its outer peripheral face over its entire axial length. A wall of the mounting hole 111 of the wheel carrier 110 is equipped with an inner thread 112, which corresponds to the outer thread 102 and is provided for mechanical engagement with the outer thread 102. The wheel hub bearing 101 is mounted in the wheel carrier 110 in that the outer ring of the wheel hub bearing 101 is screwed into the inner thread 112 of the mounting hole 111.

In view of the indicated prior art, the area of fixing structures for wheel hub bearings leaves room for improvement.

SUMMARY

The disclosure is based on an object of providing a wheel hub bearing unit of a motor vehicle that can be reliably mounted, securely in position, with reduced complexity, and largely avoids restrictions relating to a possible spatial arrangement of the hub bearing, wheel carrier and brake caliper.

It is pointed out that the features and measures listed individually in the description below may be combined in any technically sensible fashion and disclose further embodiments of the disclosure. The description characterizes and specifies the disclosure further, in particular in connection with the Figures.

The wheel hub bearing unit according to the disclosure of a motor vehicle comprises at least one roller bearing that mounts a wheel hub. The roller bearing contains an outer ring which, on an outer peripheral face, is at least partially equipped with a first threaded element, and at least one inner ring. Furthermore, the wheel hub bearing unit according to the disclosure comprises a wheel carrier with a mounting hole, a wall of which is at least partially equipped with a second threaded element that is provided for mechanical engagement with the first threaded element.

According to the disclosure, it is proposed that the outer ring and the wheel carrier each have at least one contact face, which are provided to come into mutual mechanical contact when the roller bearing is mounted in the wheel carrier.

The terms "first", "second", etc. used here serve merely for the purpose of distinction. In particular, their use does not imply any order or priority of the objects cited in connection with these terms.

In a mounted state of a wheel bearing, the first threaded element and the second threaded element are in constant mechanical engagement. The mounted state may be achieved by screwing the outer ring into the mounting hole.

The term "provided for this" in the sense of the disclosure means particularly designed or arranged for this purpose.

The proposed wheel hub bearing unit may be mounted with little installation complexity, whereby contact faces provided achieve a secure and precisely defined positioning of the roller bearing on the wheel carrier. By avoiding additional fixing elements, restrictions in relation to possible spatial arrangements of the hub bearing, wheel carrier and brake caliper can be avoided.

The wheel hub bearing unit according to the disclosure can be used particularly advantageously for motor vehicles. The term "motor vehicle" in the sense of this disclosure means in particular a car, a truck or a bus.

Preferably, the outer ring has at least one pair of peripheral faces that stand opposite each other relative to an axis of the roller bearing, and are provided for mechanical engagement with the tool, for example a hand tool formed as a wrench. Particularly, advantageously, the outer ring has three pairs of mutually opposed peripheral faces with even peripheral spacing, which form a hexagon arrangement. In this way, simple installation is possible, avoiding use of special tools.

On driven wheels of a motor vehicle, the mounting hole may be provided in particular for passage of a drive shaft.

In preferred embodiments of the wheel hub bearing unit, the first threaded element and the second threaded element are formed as right-hand threads if the wheel hub bearing unit is provided for use on a right-hand side of a motor vehicle. If the wheel hub bearing unit is provided for use on a left-hand side of a motor vehicle, the first threaded element and the second threaded element are formed as left-hand threads.

The term "right-hand (or left-hand) thread" in the sense of the disclosure means in particular a thread in which, in a front view onto the thread, the thread flanks rise towards a right (or left). Another term for a right-hand (or left-hand) thread is therefore also a "thread with right-hand pitch (or left-hand pitch)".

In this way, a loosening or detachment of the roller bearing in the wheel carrier can be effectively avoided, since friction forces acting in normal forward motion of the motor vehicle are oriented such that the contact faces of the outer ring and wheel carrier are held in mutual mechanical contact.

Preferably, a contact face of the outer ring is formed by an inwardly directed end face, and a contact face of the wheel carrier is formed by an inner face, arranged perpendicular to an axis of the mounting hole, of a protuberance of the wheel carrier arranged facing towards the axis in a radial direction. Here, the protuberance arranged facing towards the axis at least partially overlaps the outer ring in an axial direction relative to the mounting hole.

The terms "inner", "front" or "forward" used in this application should be understood, in the sense of the disclosure, in particular in relation to a mounted state of the roller bearing, and a longitudinal axis of the motor vehicle, wherein "inner" means closer to the longitudinal axis, and "front" means further away from the longitudinal axis. The term "in the axial direction" in the sense of this disclosure means in particular looking in a direction parallel to the axis.

In the mounted state of the wheel hub bearing unit, the axis of the mounting hole coincides with an axis of the roller bearing.

In this way, the contact face of the outer ring and the contact face of the wheel carrier can be provided in a structurally particularly simple and economic fashion.

In preferred embodiments, the contact face of the outer ring, at an inner end of the outer ring, has a form of a casing surface of a truncated cone. The contact face of the wheel carrier is formed by a surface of frustoconical form that is configured as an inner face, oriented obliquely to the axis of the mounting hole, of a protuberance of the wheel carrier facing towards the axis in a radial direction. The protuberance at least partially overlaps the outer ring in an axial direction relative to the mounting hole.

As well as a structurally, particularly simple and economic provision of the contact face of the outer ring and the contact face of the wheel carrier, in this way a surface pressure can be created during assembly of the wheel hub bearing unit, which pressure is oriented radially to the axis of the mounting hole and generates a self-retaining force between the first threaded element and the second threaded element, so that mechanical engagement between the two, first and second threaded elements can be secured in a self-locking fashion without additional measures.

A self-locking effect between the first threaded element and second threaded element can also be achieved if the first threaded element is arranged at an inner end of the outer ring, the contact face of the outer ring, in a front area of the outer ring, has the form of a casing surface of a truncated cone, and the contact face of the wheel carrier is formed by a surface of frustoconical form that is configured as an inner face, oriented obliquely to the axis of the mounting hole, in a front area of the mounting hole of the wheel carrier, which face at least partially overlaps the outer ring in an axial direction relative to the mounting hole.

Preferably, half opening angles and symmetry axes of the two truncated cones substantially coincide. In this way, in the mounted state of the roller bearing in the wheel carrier, a particularly large proportion of the contact faces comes into mutual mechanical contact, whereby a position of the roller bearing can be secured particularly well.

Preferably, the half opening angles of the two truncated cones lie in a range between 10° and 45°, whereby a particularly effective mutual mechanical contact of the contact faces can be achieved to secure the position of roller bearing.

In a preferred embodiment of the wheel hub bearing unit, the wheel carrier is produced mainly from aluminum or an aluminum alloy, which reduces a mass of the motor vehicle, in particular an unsprung mass, and as a result achieves an improved driving behavior of the motor vehicle.

The term "mainly" in the sense of the disclosure means in particular a proportion of more than 50% by volume, preferably more than 70% by volume, and particularly preferably more than 90% by volume. In particular, the term includes the possibility that the wheel carrier is made completely, i.e. 100% by volume, from aluminum or an aluminum alloy.

In a further aspect of the disclosure, a wheel hub unit of a motor vehicle is proposed. The wheel hub unit comprises a wheel hub and a wheel hub bearing unit according to the disclosure for mounting the wheel hub. The advantages described in connection with the wheel hub bearing unit apply also in full to the wheel hub unit.

The inner ring of the roller bearing may be designed as a separate component that may be fixedly connected to a surface of the wheel hub.

BRIEF DESCRIPTION OF THE DRAWINGS

FIG. 1 shows a diagrammatic depiction of a wheel hub bearing unit of a motor vehicle according to the prior art in a sectional side view;

FIG. 2 shows a diagrammatic partial depiction of a wheel hub unit of a motor vehicle with an embodiment of a wheel hub bearing unit according to the disclosure in a sectional side view.

DETAILED DESCRIPTION

Figure 3:
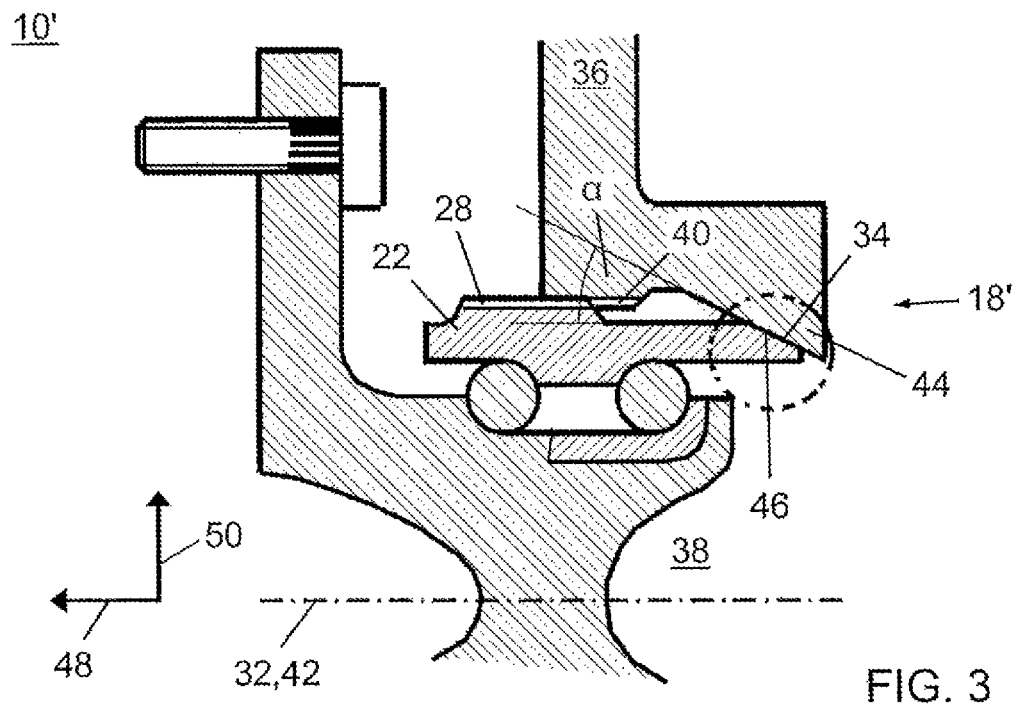
FIG. 3 shows a diagrammatic partial depiction of a wheel hub unit of a motor vehicle with an alternative embodiment of a wheel hub bearing unit according to the disclosure in the same view, and FIG. 4 a shows a diagrammatic partial depiction of a wheel hub unit of a motor vehicle with a further embodiment of a wheel hub bearing unit according to the disclosure in the same view.

As required, detailed embodiments of the present disclosure are disclosed herein; however, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

In the various Figures, the same parts always carry the same reference signs, so these are usually only described once.

FIG. 2 shows a diagrammatic depiction of a wheel hub unit 10 of a motor vehicle with an embodiment of a wheel hub bearing unit 18 according to the disclosure in a sectional side view. The wheel hub bearing 10 contains a wheel hub 12 and the wheel hub bearing unit 18. The wheel hub 12 has a flange 14, known in itself, on which a rim of a wheel (not shown) of the motor vehicle can be releasably attached by screw bolts 16 arranged peripherally at equal intervals.

The wheel hub bearing unit 18 of the motor vehicle comprises a roller bearing 20 for mounting the wheel hub 12, and a wheel carrier 36 with a mounting hole 38. The wheel carrier 36 is made completely of an aluminum alloy in order to reduce the unsprung mass of the motor vehicle.

The roller bearing 20 contains an outer ring 22 and an inner ring 24. Two rows of balls 26 arranged peripherally are provided between the outer ring 22 and the inner ring 24 as rolling bodies of the roller bearing 20.

In a front area of an outer peripheral face, the outer ring 22 is equipped with a first threaded element 28 configured as an outer thread. A front region of a wall of the mounting hole 38 of the wheel carrier 36 is equipped with a second threaded element 40 configured as an inner thread. The second threaded element 40 corresponds to the first threaded element 28 of the outer ring 22. The first threaded element 28 and the second threaded element 40 are provided for mutual mechanical engagement. The roller bearing 20 is mounted in the wheel carrier 36 in that the first threaded element 28 of the outer ring 22 of the roller bearing 20 is screwed into the second threaded element 40 of the mounting hole 38. To facilitate mounting, the outer ring 22 on a front end face has a hexagon arrangement 30 of opposing peripheral faces with even peripheral spacing, which can be brought into mechanical engagement with an open-ended wrench of corresponding size. In a mounted state of the wheel hub bearing unit 18 shown in FIG. 2, an axis 32 of the roller bearing 20 coincides with an axis 42 of the mounting hole 38.

The wheel hub bearing unit 10 shown in FIG. 2 is provided for use on a left-hand side of the motor vehicle. The first threaded element 28 and the second threaded element 40 are therefore configured as left-hand threads, in order to prevent loosening or even separation of the mutual mechanical engagement under an effect of friction forces during travel of the motor vehicle.

If the wheel hub unit 10 were provided for use on a right-hand side of the motor vehicle, the first threaded element 28 and the second threaded element 40 would have to be configured as right-hand threads.

The wheel carrier 36 has a peripheral protuberance 44 that is arranged facing towards the axis 42 of the mounting hole 38 in a radial direction 50, and partially overlaps the outer ring 22 in an axial direction 48 relative to the mounting hole 38. An inner face of the protuberance 44 arranged perpendicularly to the axis 42 of the mounting hole 38 forms a contact face 46 of the wheel carrier 36.

A contact face 34 of the outer ring 22 is formed by an inwardly directed end face of the outer ring 22. The contact face 34 of the outer ring 22 and the contact face 46 of the wheel carrier 36 are provided to come into mutual mechanical contact when the roller bearing 20 is mounted in the wheel carrier 36, as illustrated by FIG. 2. The contact faces 34, 46 provided ensure a secure and precisely defined positioning of the roller bearing 20 on the wheel carrier 36.

Figure 4:
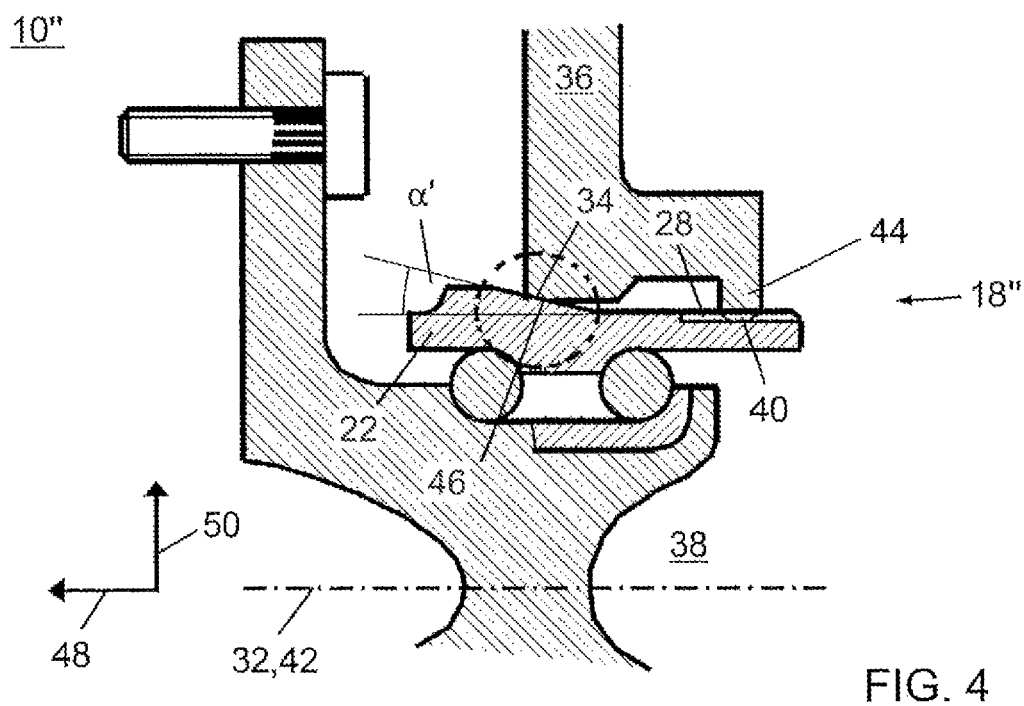

FIGS. 3 and 4 show diagrammatic partial depictions of wheel hub units 10', 10" of a motor vehicle with alternative embodiments of the wheel hub bearing unit 18', 18" according to the disclosure in the same view.

To avoid repetition, only the differences in the alternative embodiments of the wheel hub bearing unit, compared with the embodiment of the wheel hub bearing unit 18 of the wheel hub unit 10 according to FIG. 2, are described below.

FIG. 3 shows a diagrammatic partial depiction of a wheel hub unit 10' of a motor vehicle with an alternative embodiment of a wheel hub bearing unit 18' according to the disclosure in the same view as FIG. 2.

In the alternative embodiment of a wheel hub bearing unit 18' according to the disclosure, the contact face 34 of the outer ring 22 is formed on an inner end of the outer ring 22 in the form of a casing surface of a truncated cone. A half opening angle $\alpha$ of the truncated cone lies in a range between 10° and 45°, and is around 25°.

The wheel carrier 36 has a protuberance 44, which is arranged facing towards the axis 42 of the mounting hole 38 in the radial direction 50, and partially overlaps the outer ring 22 in an axial direction 48 relative to the mounting hole 38, and an inner face that is oriented obliquely to the axis 42 of the mounting hole 38 and forms the contact face 46 of the wheel carrier 36. The inner face has the form of a casing surface of a truncated cone. A half opening angle $\alpha$ of the frustoconical form of the inner face coincides with the half opening angle $\alpha$ of the frustoconical form of the contact face 34 of the outer ring 22. The symmetry axes of the two truncated cones coincide with the axis 42 of the mounting hole 38.

During mounting of the wheel hub bearing unit 18, a surface pressure is exerted between the contact face 34 of the outer ring 22 and the contact face 46 of the wheel carrier 36, which generates a self-retaining force between the first threaded element 28 and the second threaded element 40, so that the mechanical engagement between the two threaded elements 28, 40 is secured in self-locking fashion, i.e. without additional measures.

FIG. 4 shows a diagrammatic partial depiction of a wheel hub unit 10" of a motor vehicle with a further embodiment of the wheel hub bearing unit 18" according to the disclosure in the same view as in FIGS. 2 and 3.

In the further embodiment of a wheel hub bearing unit 18" according to the disclosure, the first threaded element 28 is arranged on an inner end of the outer ring 22. The contact face 34 of the outer ring 22, in a front region of the outer ring 22, has the form of a casing surface of a truncated cone. A half opening angle α' of the truncated cone lies in a range of between 10° and 45°, and is around 15°.

The second threaded element 40 is arranged on the protuberance 44 arranged facing towards the axis 42 of the mounting hole 38 in the radial direction 50.

In a front region of the mounting hole 38, the wheel bearing 36 has an inner face, oriented obliquely to the axis 42 of the mounting hole 38, in the form of a casing surface of the truncated cone, which forms the contact face 46 of the wheel carrier 36. The inner face partially overlaps the outer ring 22 in an axial direction 48 relative to the mounting hole 38.

A half opening angle α' of the frustoconical form of the inner face coincides with the half opening angle α' of the frustoconical form of the contact face 34 of the outer ring 22. The symmetry axes of the two truncated cones coincide with the axis 42 of the mounting hole 38.

As in the embodiment of the wheel hub bearing unit 18' according to FIG. 3, during mounting of the wheel hub bearing unit 18", a surface pressure is exerted between the contact face 34 of the outer ring 22 and the contact face 46 of the wheel carrier 36, which generates a self-retaining force between the first threaded element 28 and the second threaded element 40.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A wheel hub bearing unit of a motor vehicle, comprising:
   at least one roller bearing that mounts a wheel hub, the at least one roller bearing comprising an outer ring at least partially equipped with a first threaded element on an outer peripheral face of the outer ring, and at least one inner ring; and
   a wheel carrier with a mounting hole for receiving the roller bearing, the wheel carrier including a wall at least partially equipped with a second threaded element for mechanical engagement with the first threaded element, wherein the outer ring and wheel carrier each have at least one contact face that mutually, mechanically contact when the roller bearing is mounted in the wheel carrier and the first and second threaded elements are engaged, the first and second threaded elements are formed as right-hand threads if the wheel hub bearing unit is on a right-hand side of the vehicle, and are formed as left-hand threads if the wheel hub bearing unit is on a left-hand side the vehicle,
   wherein the contact face of the outer ring is formed by an end face of the roller bearing, and the contact face of the wheel carrier is formed by an inner face of a protuberance of the wheel carrier, the protuberance being arranged protruding toward an axis of the mounting hole in a radial direction and at least partially overlapping the outer ring in an axial direction relative to the mounting hole, and wherein the end face of the roller bearing is inward with respect to a longitudinal axis of the vehicle, and the contact face of the wheel carrier is formed by an inner face of the protuberance, with respect to the longitudinal axis, and the inner face is arranged perpendicularly to the axis of the mounting hole.

2. The wheel hub bearing unit as claimed in claim 1, wherein the wheel carrier is an aluminum alloy.

3. A vehicle wheel comprising:
   a wheel hub bearing for mounting a hub, the wheel hub bearing comprising an outer ring having a first thread on a peripheral face; and
   a carrier with a mounting hole defined by a wall, the carrier including a second thread for mechanical engagement with the first thread of the wheel hub bearing, wherein surfaces of the outer ring and carrier are in mechanical contact responsive to the wheel hub bearing being engaged with the carrier,
   wherein the contact face of the outer ring is formed by an inwardly directed end face with respect to a longitudinal axis of a vehicle, and wherein the contact face of the carrier is formed by an inner face of a protuberance of the wheel carrier with respect to the longitudinal axis, the protuberance being arranged protruding toward an axis of the mounting hole in a radial direction and the inner face arranged facing perpendicularly to the axis of the mounting hole, the protuberance at least partially overlapping the outer ring in an axial direction relative to the mounting hole.

4. The vehicle wheel as claimed in claim 3, wherein the carrier is an aluminum alloy.

5. A vehicle comprising:
   a wheel hub bearing for mounting a hub, the wheel hub bearing comprising an outer ring having a first thread on a peripheral face; and
   an aluminum carrier with a mounting hole defined by a wall equipped with a second thread for mechanical engagement with the first thread, wherein the outer ring and carrier each have a contact face that mechanically contact responsive to the bearing being mounted in the carrier,
   wherein at an inner end of the outer ring with respect to a longitudinal axis of the vehicle, the contact face of the outer ring forms a casing surface of a truncated cone, and wherein the contact face of the carrier is an inner face of a protuberance being arranged facing toward an axis of the mounting hole in a radial direction, the inner face forming a frustoconical surface oriented obliquely to the axis of the mounting hole, and the protuberance overlapping the outer ring in an axial direction relative to the mounting hole.

6. The vehicle of claim 5, wherein the first thread is arranged at an inner end of the outer ring.

7. The vehicle of claim 5, wherein a half opening angle of the truncated cone and a half opening angle of the frustoconical surface substantially coincide, and symmetry axes of the truncated cone and the frustoconical surface substantially coincide.

8. The vehicle of claim 7, wherein the half opening angles of the truncated cone and the frustoconical surface lie in a range between 10° and 45°.

* * * * *